US009598071B2

(12) United States Patent
Johri et al.

(10) Patent No.: US 9,598,071 B2
(45) Date of Patent: Mar. 21, 2017

(54) METHOD AND SYSTEM FOR ADAPTIVE MOTOR POWER LOSS ESTIMATION IN HYBRID ELECTRIC VEHICLES

(71) Applicant: Ford Global Technologies, LLC, Dearborn, MI (US)

(72) Inventors: Rajit Johri, Ann Arbor, MI (US); Wei Liang, Farmington Hills, WI (US); Xiaoyong Wang, Novi, MI (US); Mark Steven Yamazaki, Canton, MI (US); Ming Lang Kuang, Canton, MI (US); Ryan Abraham McGee, Shanghai (CN)

(73) Assignee: Ford Global Technologies, LLC, Dearborn, MI (US)

( * ) Notice: Subject to any disclaimer, the term of this patent is extended or adjusted under 35 U.S.C. 154(b) by 74 days.

(21) Appl. No.: 14/221,476

(22) Filed: Mar. 21, 2014

(65) Prior Publication Data

US 2015/0266466 A1 Sep. 24, 2015

(51) Int. Cl.
*B60L 9/00* (2006.01)
*B60L 11/00* (2006.01)
(Continued)

(52) U.S. Cl.
CPC ............ *B60W 20/10* (2013.01); *B60W 10/06* (2013.01); *B60W 10/08* (2013.01); *B60W 10/26* (2013.01); *B60W 30/188* (2013.01); *B60W 40/12* (2013.01); *B60K 2006/4825* (2013.01); *B60W 2050/005* (2013.01); *B60W 2050/0014* (2013.01); *B60W 2050/0024* (2013.01); *B60W 2050/0025* (2013.01); *B60W 2050/0026* (2013.01); *B60W 2510/081* (2013.01);
(Continued)

(58) Field of Classification Search
CPC . F16D 2500/10462; F16D 2500/30406; F16D 2500/50607; F16D 11/10; F16D 48/06; F16H 2061/0422; F16H 2061/0474; F16H 2061/2823; F16H 61/0403; B60W 2510/244; B60W 20/10; B60W 2510/081; B60W 2510/083; B60W 2520/10; B60W 2540/10; B60L 2240/423; B60L 11/123; B60L 11/1862; B60L 15/02; B60L 2240/545; Y02T 10/7077; Y02T 10/6239; Y02T 10/56; Y02T 10/6252; Y02T 10/6217; Y02T 10/6286; Y02T 10/70; B60K 6/365; B60K 6/445; Y10S 903/93
USPC ......... 701/22, 54, 55; 477/3; 180/65.1, 54.1, 180/65.21, 65.265, 65.28, 65.285, 65.8; 318/139, 140
See application file for complete search history.

(56) References Cited

U.S. PATENT DOCUMENTS 7,024,299 B2 4/2006 Hubbard et al.
7,076,356 B2 7/2006 Hubbard et al.
(Continued)

*Primary Examiner* — Faris Almatrahi
*Assistant Examiner* — Rachid Bendidi
(74) *Attorney, Agent, or Firm* — David B. Kelley; Brooks Kushman P.C.

(57) ABSTRACT

A control strategy for a hybrid electric vehicle powertrain having an engine, a motor, and a transmission includes operating the powertrain according to a motor power loss term that is adapted based on battery power supplied to the motor, motor power output, and an estimated motor power loss such that the motor power loss term changes over time and converges to a constant value to thereby be indicative of actual motor power loss.

7 Claims, 3 Drawing Sheets

(51) Int. Cl.
    *G05D 1/00* (2006.01)
    *G05D 3/00* (2006.01)
    *G06F 7/00* (2006.01)
    *G06F 17/00* (2006.01)
    *B60W 20/00* (2016.01)
    *B60W 10/06* (2006.01)
    *B60W 10/08* (2006.01)
    *B60W 10/26* (2006.01)
    *B60W 40/12* (2012.01)
    *B60W 30/188* (2012.01)
    *B60W 50/00* (2006.01)
    *B60K 6/48* (2007.10)

(52) U.S. Cl.
    CPC . *B60W 2510/083* (2013.01); *B60W 2710/086* (2013.01); *Y02T 10/56* (2013.01); *Y02T 10/6252* (2013.01); *Y02T 10/6286* (2013.01); *Y02T 10/7258* (2013.01); *Y10S 903/93* (2013.01)

(56) References Cited

U.S. PATENT DOCUMENTS

| | | | |
|---|---|---|---|
| 8,116,926 B2 | 2/2012 | Okubo et al. | |
| 2005/0080537 A1* | 4/2005 | Cawthorne | B60K 6/445 701/51 |
| 2005/0182526 A1* | 8/2005 | Hubbard | B60K 6/445 701/1 |
| 2005/0256623 A1* | 11/2005 | Hubbard | B60L 11/123 701/54 |
| 2009/0118884 A1* | 5/2009 | Heap | B60K 6/365 701/22 |
| 2009/0118918 A1* | 5/2009 | Heap | B60K 6/365 701/54 |
| 2009/0118920 A1* | 5/2009 | Heap | B60K 6/365 701/54 |
| 2009/0118938 A1* | 5/2009 | Heap | B60K 6/365 701/54 |
| 2010/0323844 A1* | 12/2010 | Okubo | B60K 6/445 477/3 |
| 2011/0106351 A1* | 5/2011 | Sah | B60K 6/365 701/22 |
| 2014/0081500 A1* | 3/2014 | Ito | B60K 6/445 701/22 |

* cited by examiner

METHOD AND SYSTEM FOR ADAPTIVE MOTOR POWER LOSS ESTIMATION IN HYBRID ELECTRIC VEHICLES

TECHNICAL FIELD

The present invention relates to estimating motor power loss in a hybrid electric vehicle.

BACKGROUND

A hybrid electric vehicle powertrain includes an engine and an electric motor, wherein torque (or power) produced by the engine and/or the motor can be transferred through a transmission to the vehicle drive wheels to propel the vehicle. A traction battery supplies energy to the motor. In certain powertrains, the engine is connectable to the motor by a disconnect clutch and the motor is connected to the transmission. The motor may be connected to the transmission via a torque converter. The engine, the disconnect clutch, the motor, the torque converter, and the transmission are connected sequentially in series.

Hybrid vehicle controls rely on an accurate value of the power loss of the motor. For instance, the calculation of motor torque to wheel, battery power limits and plausible violations, charging power to battery from energy management algorithm, maximum allowable regenerative brake limit, and other control strategies rely on an accurate estimation of the motor power loss.

Motor power loss is generally a function of motor speed, motor torque, and traction battery voltage supplied to the motor. Estimates of motor power losses for given combinations of motor speed and motor torque at given battery voltages can be predefined. Such predefined estimates may be generated by testing the motor (or, more particularly, for example, the finished motor prototype) on a dynamometer. The predefined estimates are stored in a map. Vehicle controls subsequently access the map to obtain an estimation of the motor power loss at a given time during operation of the vehicle and use the estimation in their control routines.

Variability in the motor during manufacturing or degradation of motor efficiency with time, temperature, and/or duty cycle can result in varied motor power losses. The predefined motor power loss map cannot capture such variability and changes.

SUMMARY

Embodiments of the present invention are directed to a controller and a control strategy ("controller") for a hybrid electric vehicle (HEV) powertrain having an engine, a motor with an associated traction battery, and a transmission in which the motor is connected to the transmission and the engine is connectable to the transmission via the motor and a disconnect clutch. The controller is configured to estimate motor power losses and adaptively learn of these losses.

In one embodiment, the controller is configured to adaptively estimate and generate a motor power loss model for the powertrain. For a given motor operating point, the controller provides an adaptive motor power loss estimation generally based on the predefined or known motor power loss term and an additional adaptive motor power loss term. The adaptive motor power loss estimation is more accurate than a motor power loss estimation based on just the predefined motor power loss term in the manner as described above in the Background Art section. In providing the adaptive motor loss estimation, the controller obtains the predefined motor power loss term from the predefined motor power loss map. The controller calculates the adaptive motor power loss term based on an estimate of the battery power and the motor power and the predefined motor power loss term. The controller may further take into consideration accessory loss in calculating the adaptive motor power loss term. The controller stores the calculated adaptive motor power loss term in a separate motor power loss map or adaptive parameters of a motor power loss model. The controller uses the adapted motor power loss map/model along with the predefined motor power loss map to estimate the motor power loss (i.e., provide the adaptive motor power loss estimation) at any given motor operating point. This can improve, for example, calculation of maximum regenerative torque limit, battery power required by energy management, motor torque buffer available to start the engine, motor maximum and minimum torque with inclusion of relatively precise or exact motor electrical losses.

In an embodiment, a method for a powertrain having an engine, a motor, and a transmission coupled in series is provided. The method includes operating the powertrain according to a motor power loss term that is adapted based on battery power supplied to the motor, motor power output, and an estimated motor power loss such that the motor power loss term changes over time and converges to a constant value to thereby be indicative of actual motor power loss.

In an embodiment, a system for the powertrain having a controller configured to carry out the method is provided.

Additional objects, features, and advantages of embodiments of the present invention will become more readily apparent from the following detailed description when taken in conjunction with the drawings, wherein like reference numerals refer to corresponding parts.

DETAILED DESCRIPTION

Detailed embodiments of the present invention are disclosed herein; however, it is to be understood that the disclosed embodiments are merely exemplary of the invention that may be embodied in various and alternative forms.

The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
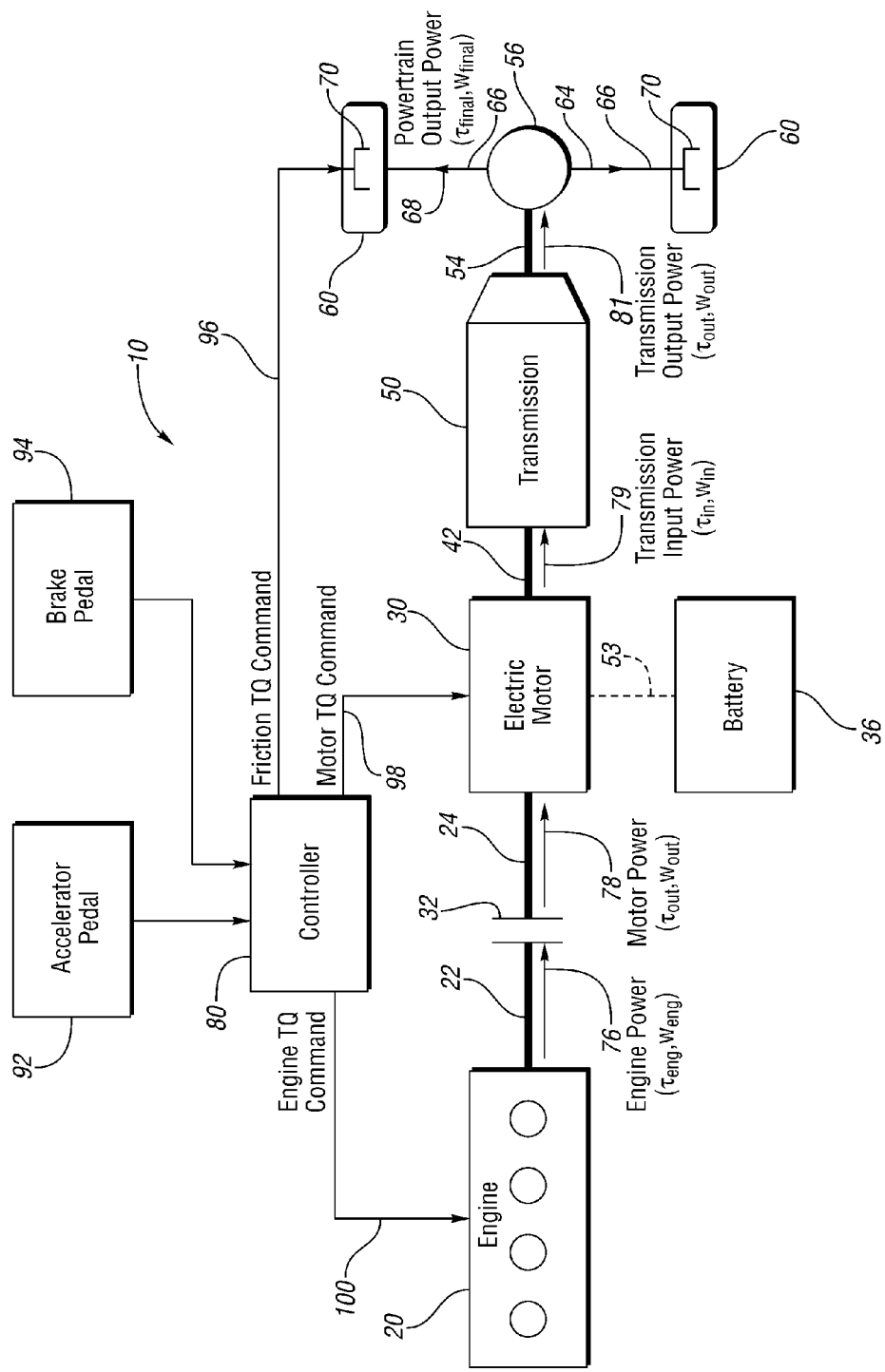
FIG. 1 illustrates a block diagram of a hybrid electric vehicle (HEV) powertrain in accordance with an embodiment of the present invention.

Referring now to FIG. 1, a block diagram of a powertrain system 10 for a hybrid electric vehicle (HEV) in accordance with an embodiment of the present invention is shown. Powertrain system 10 includes an engine 20, an electric motor/generator 30 ("motor"), a traction battery 36, and a multiple step-ratio automatic transmission 50.

Engine 20 and motor 30 are drive sources for the vehicle. Engine 20 is connectable in series to motor 30 through a disconnect clutch 32. Motor 30 is connected to the input side of transmission 50. The input side of transmission 50 is connected in series with both engine 20 and motor 30 when engine 20 is connected to motor 30 via disconnect clutch 32. In this case, transmission 50 is connected to motor 30 while at the same time being connected to engine 20 via motor 30. On the output side, transmission 50 is connected to the drive wheels 60 of the vehicle. The driving forces applied from engine 20 and/or motor 30 are transmitted through transmission 50 to drive wheels 60 thereby propelling the vehicle.

Engine 20 has an engine shaft 22 connectable to an input shaft 24 of motor 30 through disconnect clutch 32. Although disconnect clutch 32 is described and illustrated as a hydraulic clutch, other types of clutches may be used. Motor 30 has an output shaft 42 connected to the input side of transmission 50.

Powertrain system 10 may further include a torque converter with bypass clutch, or alternately a launch clutch (not shown) between motor 30 and the input side of transmission 50 for torsional isolation. In this case, motor 30 is connected to the input side of transmission 50 via the torque converter or the launch clutch. A transmission oil pump (not shown) is located on the same shaft as the motor which provides oil flow through transmission 50 for lubrication and hydraulic operation. This main pump may be supplemented by an electric auxiliary pump.

Transmission 50 includes multiple discrete gear ratios automatically selectable by a vehicle system controller 80 in response to vehicle operating conditions and a driving mode selected by the operator. The output side of transmission 50 includes an output shaft 54 that is connected to a differential 56. Drive wheels 60 are connected to differential 56 through respective axles 66. With this arrangement, transmission 50 transmits a powertrain power output 68 to drive wheels 60.

Engine 20, such as an internal combustion engine, generates an engine power 76 that is supplied to transmission 50 when engine 20 is connected to motor 30 via disconnect clutch 32. Engine power 76 corresponds to the product of engine torque ($\tau_{eng}$) and engine speed ($\omega_{eng}$) of engine 20. To drive the vehicle with engine 20, at least a portion of engine power 76 passes from engine 20 through disconnect clutch 32 to motor 30 and then from motor 30 to transmission 50. A low voltage starter (not shown) for starting engine 20 may be provided in powertrain system 10.

Battery 36 is another source of power for powertrain system 10. Motor 30 is linked to battery 36 through wiring 53. Depending on the vehicle operating mode, motor 30 either converts electric energy stored in battery 36 into a motor power 78 or sends a corresponding amount of electrical power to battery 36 when operating as a generator. Motor power 78 corresponds to the product of motor torque ($\tau_{mot}$) and motor speed ($\omega_{eng}$) of motor 30. To drive the vehicle with motor 30, motor power 78 is transmitted from motor 30 to transmission 50. When generating electrical power for storage in battery 36, motor 30 obtains power either from engine 20 in a driving mode or from the inertia in the vehicle as motor 30 acts as a brake when operating in a regenerative braking mode.

As described, engine 20, disconnect clutch 32, motor 30, and transmission 50 are connectable sequentially in series as illustrated in FIG. 1. As such, powertrain system 10 represents a HEV powertrain in which engine 20 is connected to motor 30 by disconnect clutch 32 with motor 30 being connected to transmission 50.

The state or mode of disconnect clutch 32 being engaged or disengaged determines which of engine and motor powers 76 and 78 are transferred to transmission 50. For example, if disconnect clutch 32 is disengaged, then only motor power 78 is supplied to transmission 50. If disconnect clutch 32 is engaged/locked, then both engine power 76 and motor power 78 are supplied to transmission 50. Of course, if only engine power 76 is desired for transmission 50, disconnect clutch 32 is engaged/locked, but motor 30 is not energized such that engine power 76 is only supplied to transmission 50.

The total amount of engine power 76 and motor power 78 transferred to the input side of transmission 50 is the transmission input power ($\tau_{in}$, $\omega_{in}$) 79. Transmission 50 includes clutches, bands, gears, and the like, and planetary gear sets to effect different discrete gear ratios by selective engagement of friction elements to establish torque flow paths and provide the corresponding desired multiple step-ratios. The friction elements are controllable through a shift schedule within controller 80 or a dedicated transmission controller that connects and disconnects certain elements of the planetary gear sets to control the ratio between the transmission input and the transmission output. Transmission 50 is automatically shifted from one ratio to another based on the needs of the vehicle. Transmission 50 provides transmission output power ($\tau_{out}$, $\omega_{out}$) 81 to transmission output shaft 54. In turn, drive wheels 60 receive powertrain output power ($\tau_{final}$, $\omega_{final}$) 68.

Powertrain system 10 further includes an accelerator pedal 92. The driver of the vehicle depresses accelerator pedal 92 to propel the vehicle. In response, a total drive command based on the positioning of accelerator pedal 92 is provided to controller 80. Controller 80 apportions the total drive command between engine power and motor power to be provided to transmission 50. In particular, controller 80 apportions the total drive command between (i) an engine torque command 100 (which represents the amount of engine torque to be provided from engine 20, operating at a corresponding engine speed, to transmission 50) and (ii) a motor torque command 98 (which represents the amount of motor torque to be provided from motor 30, operating at a corresponding motor speed, to transmission 50). In turn, engine 20 generates engine power 76 and motor 30 generates motor power 78. Engine power 76 and motor power 78 are supplied to transmission 50 (assuming that engine 20 is connected to motor 30 via disconnect clutch 32) such that the vehicle is propelled.

Powertrain system 10 further includes a brake pedal 94. The driver of the vehicle depresses brake pedal 94 to slow or brake the vehicle. In response, a total brake command based on the positioning of brake pedal 94 is provided to controller 80. Controller 80 apportions the total brake command between (i) powertrain braking power to be provided by engine 20 and/or motor 30 to transmission 50 to brake the vehicle and (ii) friction braking power to be applied by friction brakes 70 to drive wheels 60 for braking the vehicle.

The powertrain braking power represents "negative" powertrain power to be provided by engine 20 and/or motor 30 to transmission 50 for braking the vehicle. Controller 80 apportions the powertrain braking power between (i) engine torque command 100 (which in this case represents the amount of negative engine torque to be provided from engine 20, operating at a corresponding engine speed, to transmission 50 for braking the vehicle) and (ii) motor torque command 98 (which in this case represents the amount of negative motor torque to be provided from motor 30, operating at a corresponding motor speed, to transmission 50 for braking the vehicle). In turn, engine 20 generates engine power 76 and motor 30 generates motor power 78 for vehicle braking. Engine power 76 and motor power 78 are supplied to transmission 50 (assuming that engine 20 is connected to motor 30 via disconnect clutch 32) to brake the vehicle. Controller 80 further generates a friction braking torque command 96 (which represents the amount of torque to be obtained through friction brakes 70). In turn, friction brakes 70 apply the friction braking torque to drive wheels 60 for vehicle braking.

Controller 80 includes a high-voltage battery controller (BECM) which monitors battery temperature, voltage, current, and battery state-of-charge (SOC) and determines maximum allowable discharge and charge power limits. In conjunction with apportioning the total drive (or brake) command, controller 80 determines the powertrain operating point to maintain battery SOC, minimize fuel consumption, and deliver the driver demanded vehicle operation.

As indicated above, embodiments of the present invention are directed to a control strategy or algorithm ("control strategy") for estimating motor power losses and adaptively learning of these losses in HEV powertrains. In this regard, the control strategy adaptively estimates and generates a motor power loss model for the powertrain. Solutions provided by the control strategy for the adaptive motor power loss estimation are unique to hybrid powertrains such as HEV powertrains in which an electric motor delivers driveline torque. The control strategy uses a battery power measurement and motor power measurement to adaptively learn of the motor power losses.

In general, the control strategy (e.g., controller 80 configured to carry out the control strategy) calculates an adaptive motor power loss term based on an estimate of the battery power and the motor power and the predefined motor power loss term. Controller 80 obtains the estimate of the battery power and the motor power from current and voltage sensors on traction battery 36 and from torque and speed sensors of motor 30, respectively. Controller 80 obtains the predefined motor power loss term from the predefined motor power loss map. Controller 80 stores the calculated adaptive motor power loss term in a separate motor power loss map or adaptive parameters of a motor power loss model. Controller 80 estimates the motor power loss (i.e., provides the adaptive motor power loss estimation) at any given motor operating point from the sum of the adapted motor power loss term and the predefined motor power loss term for that given motor operating point. As such, controller 80 uses the adaptive motor power loss map along with the predefined motor power loss map to estimate the motor power loss at any given motor operating point.

The control strategy carried out by controller 80 to estimate motor power loss and adaptively learn of the motor power loss for a powertrain will now be described in greater detail. At the commencement of the control strategy, the adaptive motor power loss term $L_{mot,adp}$ is initialized to zero.

During operation of motor 30, controller 80 calculates the error e (or difference) in the battery power and the motor power according to the following equation:

$$e = (V_{batt} * I_{batt}) - (\tau_{mot} * \omega_{mot}) - L_{mot,map} - L_{DCDC} \quad (1)$$

where e is the error in power, $V_{batt}$ and $I_{batt}$ are the voltage and current of battery 36, respectively, $\tau_{mot}$ and $\omega_{mot}$ are the torque and speed of motor 30, $L_{mot,map}$ is the fixed, predefined motor power loss term from the predefined motor power loss map, and $L_{DCDC}$ is high-voltage accessory loss including inverter and air-conditioning losses. Another loss factor, $P_{aux}$ is the high-voltage auxiliary loss power, e.g., air compressor power consumption when the AC is on. The error in power e is used for adaptive learning of the motor power loss and to update the adaptive motor power loss term $L_{mot,adp}$.

Controller 80 includes a current and voltage sensor on battery 36 for detecting the voltage and current of battery 36. Likewise, controller 80 includes a torque and speed sensor on motor 30 for detecting the motor torque and the motor speed.

The final adaptive motor power loss estimate $L_{mot}$ provided by controller 80 is given by the following equation:

$$L_{mot} = L_{mot,map} + L'_{mot,adp} + L_{corr} \quad (2)$$

where $L'_{mot,adp}$ is the adaptive motor power loss term from the adaptive motor power loss map and $L_{corr}$ is a fast power loss correction term described in greater detail below.

The adaptive motor power loss term $L'_{mot,adp}$ is modeled as a second order polynomial that is a function of motor speed and motor torque according to the following equations:

$$L'_{mot,adp} = w_0 + w_1 \omega_{mot} + w_2 \tau_{mot} + w_3 \omega_{mot}^2 + w_4 \tau_{mot}^2 + w_5 \omega_{mot} \tau_{mot} \quad (3)$$

$$L'_{mot,adp} = \overline{w} \cdot \overline{u} \quad (4)$$

where $$\overline{w} = (w_0, w_1, \ldots, w_5)$$

$$\overline{u} = (1, \omega_{mot}, \tau_{mot}, \omega_{mot}^2, \tau_{mot}^2, w_{mot} \tau_{mot})^T$$

Figure 2:
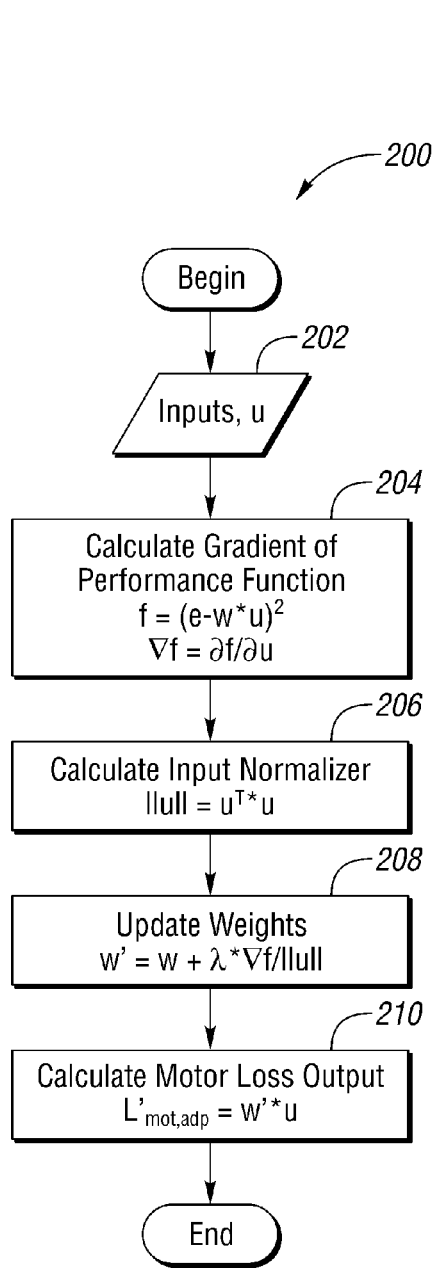
FIG. 2 illustrates a flowchart describing operation of a control strategy employing a least mean square ("LMS") based learning algorithm for an adaptive motor power loss estimation in a HEV powertrain in accordance with an embodiment of the present invention.

Referring now to FIG. 2, a flowchart 200 describing operation of the control strategy employing a least mean square ("LMS") based learning algorithm for the adaptive motor power loss estimation $L_{mot}$ in accordance with an embodiment of the present invention is shown. Initially, the coefficients ($w_0, w_1, \ldots, w_5$) in equation (3) are initialized to zero. The LMS-based adaptive learning algorithm is employed to update the values of the coefficients. That is, although the coefficients are unknown, it is known than some combination will provide an accurate estimation of the adaptive motor power loss term at a given motor operating point. The LMS-based algorithm is to determine the coefficients such that when given a specific motor torque and motor speed (i.e., a specific motor operating point) the LMS-based algorithm can determine adaptive motor power term.

In operation of the LMS-based algorithm, the motor torque $\tau_{mot}$ and the motor speed $\omega_{mot}$ of motor 30 are inputs u to the control strategy as indicated in block 202.

As indicated in block 204, for a given error in power e, the LMS-based algorithm tries to minimize the performance function $f$ given by the following equation:

$$f = (e - \overline{w} \cdot \overline{u})^2 \quad (5)$$

As further indicated in block 204, the gradient of the performance function is then calculated according to the following equation:

$$\nabla f = 2(e - \overline{w} \cdot \overline{u}) \cdot \overline{u}^T \quad (6)$$

As indicated in block 206, the input parameter $\|u\|$ is calculated according to the following equation:

$$\|\overline{u}\| = (\overline{u}) \cdot \overline{u}^T \quad (7)$$

As indicated in block 208, the weights of the coefficients of the model of the adaptive motor power loss term $L_{mot,adp}$ are updated according to the following equation:

$$\overline{w}' = \overline{w} + \lambda \frac{\nabla f}{\|\overline{u}\|} \quad (8)$$

where $0 \leq \lambda \leq 1$ is the learning rate and $\overline{w}'$ is the updated coefficient vector. The learning rate is a pre-selected step size that makes the LMS-based algorithm convergent.

The coefficients $\overline{w}'$ are stored in non-volatile memory, and the learning is remembered between key-on and key-off events. As indicated in block 210, the adaptive motor power loss term $L_{mot,adp}$ is calculated according to the following equation:

$$L_{mot,adp} = \overline{w}' * \overline{u} \quad (9)$$

Figure 3:
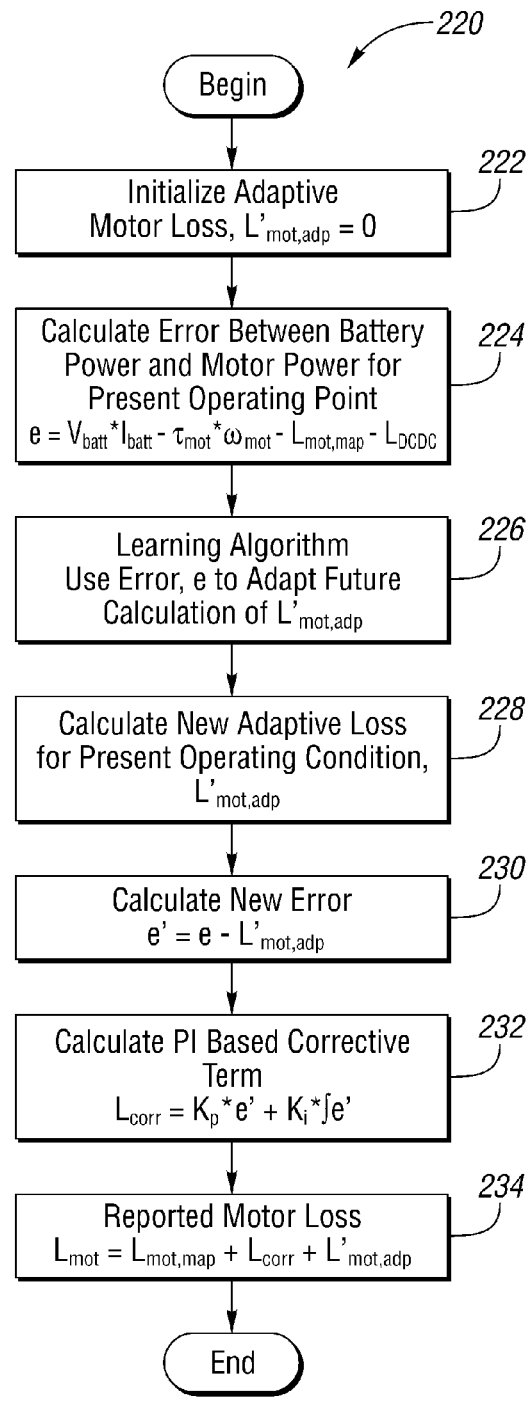
FIG. 3 illustrates a flowchart describing operation of the control strategy of FIG. 2 further employing a fast power loss correction term calculation algorithm in accordance with an embodiment of the present invention.

Referring now to FIG. 3, with continual reference to FIG. 2, a flowchart 220 describing operation of the control strategy further employing a fast power loss correction term calculation algorithm in accordance with an embodiment of the present invention is shown. As noted above with reference to equation (2), $L_{corr}$ is a fast power loss correction term. The algorithm for loss adaptation term has to consider both accuracy and stability. To prevent divergence and instability in the adaptation algorithm because of noise in the system, the learning rate is kept less than one (i.e. $0 \leq \lambda \leq 1$). This causes the algorithm to converge slowly to the adapted motor power loss map. That is, the adaptive motor power loss term $L_{mot,adp}$ is a term learned relatively slowly. In real time loss calculation, it is important to have a correct loss adjustment even before the adaption is convergent. The fast power loss corrective term $L_{corr}$ is desired for this purpose.

With reference to FIG. 3, the fast power loss correction term calculation algorithm (subject of blocks 230, 232, and 234) follows the adaptive learning algorithm which in this case is the LMS-based adaptive learning algorithm (subject of blocks 222, 224, 226, and 228). As described above with reference to FIG. 2, the control strategy commences with the adaptive motor power loss term $L_{mot,adp}$ being initialized to zero as indicated in block 222 and the error e in the battery power and the motor power being calculated according to equation (1) as indicated in block 224. The LMS-based algorithm employed for the adaptive learning is then carried out using the error in power e to adapt the future calculation of the model of the adaptive motor power loss term $L_{mot,adp}$ as indicated in block 226. The adaptive motor power loss term $L'_{mot,adp}$ for the present motor operating point is then calculated as shown in block 228.

In turn, the fast power loss correction term calculation algorithm operates to calculate the fast power loss corrective term $L_{corr}$ as follows. A proportional-integrator (PI) control-based fast error detection algorithm is used on top of the adaptive motor power loss map. Based on the predicted motor power loss at the current motor operating condition from the model of the adaptive motor power loss $L'_{mot,adp}$, as indicated in block 230, the new error in power loss term e' is calculated according to the following equation:

$$e' = e - L'_{mot,adp} \quad (10)$$

As indicated in block 232, the new power loss term e' is integrated and used to calculate the corrective term $L_{corr}$ according to the following equation:

$$L_{corr} = K_p * e' + K_i \int e' \, dt \quad (11)$$

As the adaptive algorithm proceeds, the adaptive motor loss model converges with the new power loss term error $e' \rightarrow 0$ driving the fast correction term $L_{corr} \rightarrow 0$. The reported adaptive motor power loss estimation $L_{mot}$ is then calculated according to the equation (2) as indicated in block 234.

Figures 4, 5:
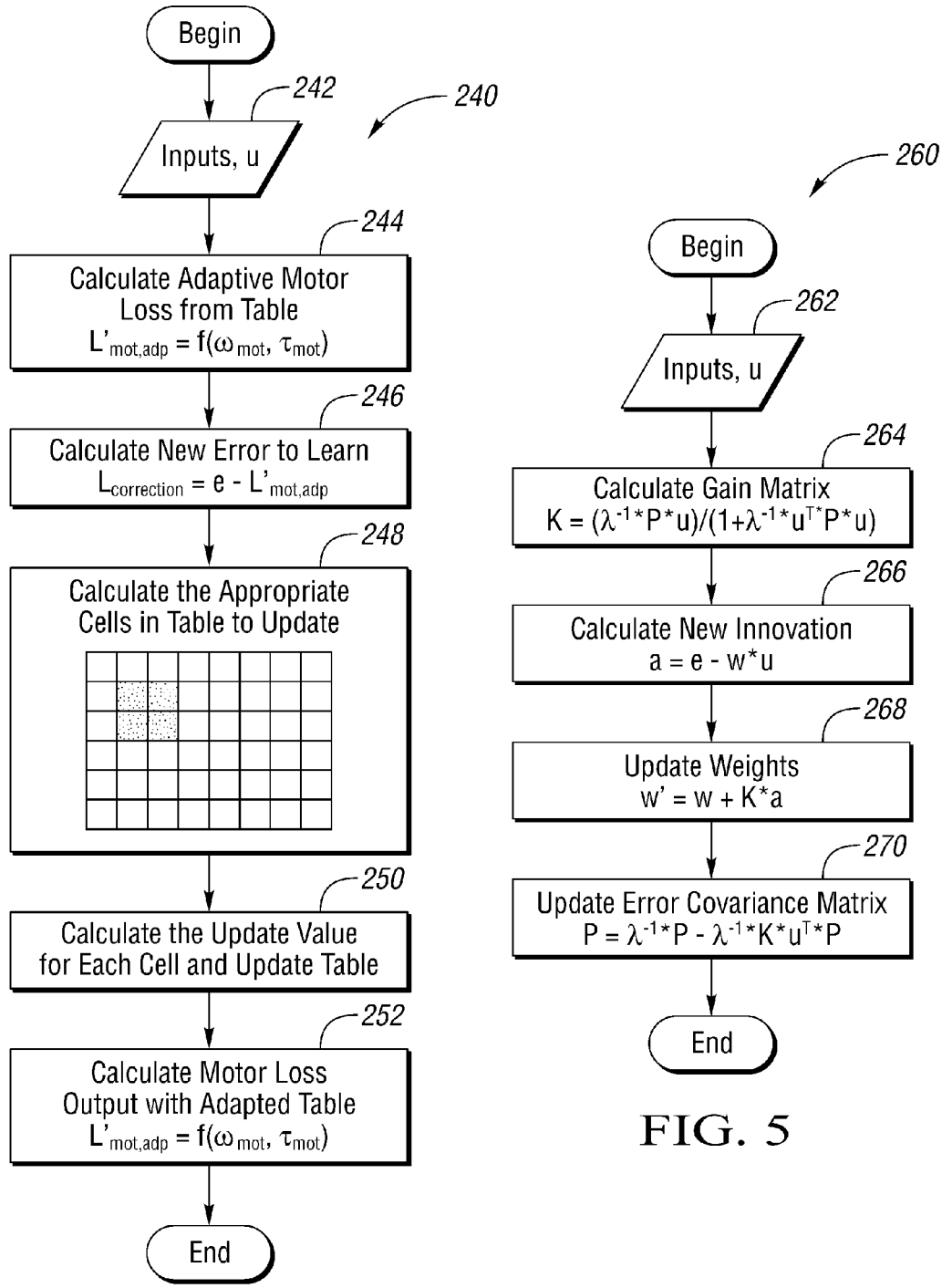
FIG. 4 illustrates a flowchart describing operation of a control strategy employing a table based learning algorithm for an adaptive motor power loss estimation in a HEV powertrain in accordance with an embodiment of the present invention.
FIG. 5 illustrates a flowchart describing operation of a control strategy employing a recursive least squares (RLS) based learning algorithm for an adaptive motor power loss estimation in a HEV powertrain in accordance with an embodiment of the present invention.

Referring now to FIGS. 4 and 5, a control strategy in accordance with embodiments of the present invention can include alternative methods of performing adaptive learning in place of the LMS-based adaptive learning algorithm. FIG. 4 illustrates a flowchart 240 describing operation of a control strategy employing a table based learning algorithm for an adaptive motor power loss estimation in a powertrain in accordance with an embodiment of the present invention. FIG. 5 illustrates a flowchart 260 describing operation of a control strategy employing a recursive least squares (RLS) based learning algorithm for an adaptive motor power loss estimation in a powertrain in accordance with an embodiment of the present invention. FIGS. 4 and 5 respectively depict two alternate algorithms for performing adaptive learning and storing the adapted motor power loss term for each given motor operating point. Again, either control strategy of FIG. 4 or 5 can be supplemented with the fast power loss term calculation algorithm described above.

In FIG. 4, flowchart 240 illustrates operation for the lookup table based learning algorithm implementation. The operation begins with the motor torque $\tau_{mot}$ and the motor speed $\omega_{mot}$ of motor 30 being inputs u to the control strategy as indicated in block 242. The adaptive motor power loss term $L'_{mot,adp}$ is then calculated from the adaptive motor power loss map/table for the current motor operating point (i.e., $L'_{mot,adp} = f(\tau_{mot}, \omega_{mot})$) as indicated in block 244. As indicated in block 246, a new error in power $L_{correction}$ to learn is calculated according to the following equation:

$$L_{correction} = e - L'_{mot,adp} \quad (12)$$

The appropriate cells in the table to update are then determined as indicated in block 248. The update value for each appropriate cell is then calculated and the table is updated as indicated in block 250. The motor power loss term $L'_{mot,adp}$ with the updated table is then calculated (i.e., $L'_{mot,adp} = f(\tau_{mot}, \omega_{mot})$) as indicated in block 252.

In FIG. 5, flowchart 260 illustrates operation for the recursive least squares (RLS) based learning algorithm implementation. The operation begins with the motor torque $\tau_{mot}$ and the motor speed $\omega_{mot}$ of motor 30 being inputs u to the control strategy as indicated in block 262. A gain matrix K is then calculated as indicated in block 264. A new innovation a is then calculated as indicated in block 266. The coefficient weights are then updated as indicated in block 268. The error covariance matrix P is then updated as indicated in block 270.

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. A system comprising:
a controller configured to operate a powertrain having a motor according to a motor power loss term based on an outputted motor power scaled by the mean of scaling factors, each scaling factor minimizing a difference, at a respective time instance, between measured battery power supplied to the motor and a sum of measured motor power scaled by the scaling factor and predefined motor power loss corresponding to the measured motor power.

2. The system of claim 1 further comprising:
at least one sensor configured to detect torque and speed of the motor;
wherein the controller is further configured to use a product of the motor torque and the motor speed as the measured motor power.

3. The system of claim 2 wherein:
the controller is further configured to employ a tables based algorithm to adapt the scaling factors to the mean of the scaling factors.

4. The system of claim 1 wherein:
the controller is further configured to employ a least mean square algorithm to adapt the scaling factors to the mean of the scaling factors.

5. The system of claim 1 wherein:
the controller is further configured to employ a recursive least mean square algorithm to adapt the scaling factors to the mean of the scaling factors.

6. The system of claim 1 further comprising:
a map having a plurality of estimated motor power losses in correspondence with a plurality of motor operating points;
wherein the controller is further configured to obtain the predefined motor power loss from the map.

7. The system of claim 1 further comprising:
a battery configured to supply the battery power supplied to the motor; and
a sensor configured to detect voltage and current of the battery, wherein the controller is further configured to use a product of the battery voltage and the battery current as the battery power supplied to the motor.

* * * * *